Figure 1:
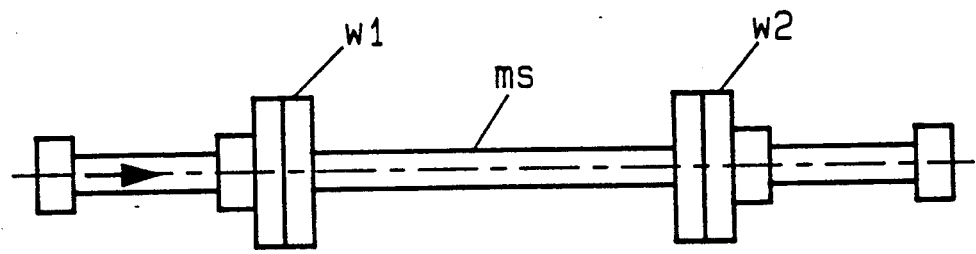

United States Patent [19]

Steinacher

[11] Patent Number: 5,105,666
[45] Date of Patent: Apr. 21, 1992

[54] ULTRASONIC FLOWMETER

[75] Inventor: Michael Steinacher, Basel, Switzerland

[73] Assignee: Endress+Hauser Flowtec AG, Switzerland

[21] Appl. No.: 516,146

[22] Filed: Apr. 30, 1990

[30] Foreign Application Priority Data

May 9, 1989 [EP] European Pat. Off. ............ 89810343

[51] Int. Cl.$^5$ .............................................. G01F 1/66
[52] U.S. Cl. ................................................ 73/861.28
[58] Field of Search ..................................... 73/861.28

[56] References Cited

U.S. PATENT DOCUMENTS 3,751,979 8/1973 Ims .
4,164,865 8/1979 Hall et al. .
4,633,719 1/1987 Vander Heyden ............. 73/861.28

FOREIGN PATENT DOCUMENTS 0200896 12/1986 European Pat. Off. .

OTHER PUBLICATIONS

Kalmus, "Electronic Flowmeter System", The Review of Scientific Instruments, vol. 25, No. 3, pp. 201-206, Mar. 1954.

Primary Examiner—Charles A. Ruehl
Attorney, Agent, or Firm—Barnes & Thornburg

[57] ABSTRACT

An ultrasonic flowmeter includes first and second ultrasonic transducers which are mounted along a fluid measuring section opposite each other and whose connecting line makes an angle different from 90° with the axis of the fluid measuring section. The transducers can be switched to transmit mode or receive mode by a switching arrangement having first and second switching paths per transducer, one conducting and the other simultaneously nonconducting, or vice versa. One end of the first and second switching paths is coupled to the associated first or second transducer. The first switching paths associated with the first and second transducers having their other ends coupled to the input of a measuring circuit, and the second switching paths associated with said first and second transducers having their other ends coupled to an oscillator. To reduce crosstalk, the switching arrangement includes two constantly nonconducting, parallel-connected switching paths coupled in series with an inverting amplifier between the oscillator output and the input of the measuring circuit or between the inputs of the two transducers.

15 Claims, 1 Drawing Sheet

ULTRASONIC FLOWMETER

The invention relates to ultrasonic flowmeters as are described, for example, in U.S. application Ser. No. 3,751,979. As shown in FIGS. 3 and 10 of that patent, a pair of opposite ultrasonic transducers, henceforth called "US transducers", is arranged along a fluid-measuring section, e.g., a pipe, such that their connecting line makes an angle different from 90° with the longitudinal axis of the fluid-measuring section.

To obtain a measurement result independent of the velocity of sound in the fluid, the US transducers are alternately switched from transmit mode to receive mode, so that the sound waves are propagated alternately in the downstream direction and in the upstream direction.

As shown in FIG. 6 of the above-mentioned U.S. application Ser. No. 3,751,979, the US transducers of the pair are switched by means of an electronic circuit which contains gates. Instead of this specific electronic circuit, meanwhile commercially available semiconductor integrated analog switching arrangements can be used, such as the various CMOS analog switches offered by Siliconix, which have several switching paths per chip.

The US transducer acting as an ultrasonic transmitter is driven from an oscillator circuit with a sinusoidal signal having a frequency of a few 10 kHz. For each US transducer, two switching paths are provided one of which is conducting and the other of which is simultaneously nonconducting, or vice versa. One end of each of the two switching paths is connected to the associated US transducer, and the other end of the conducting switching path associated with one of the US transducers is connected to the other end of the nonconducting switching path associated with the other US transducer and to the input of a measuring circuit, while the other end of the nonconducting switching path associated with said one US transducer is connected to the other end of the conducting switching path associated with said other US transducer and to the output of the oscillator circuit.

It has been found that the use of the aforementioned commercially available integrated analog switching arrangements results in crosstalk which originates from the nonconducting switching paths because the latter have or form a series of capacitance, i.e., a capacitance between the analog-signal input and the analog-signal output.

The object of the invention as claimed is to reduce this crosstalk by circuit means so that the residual crosstalk signal is acceptable, in other words, to increase the existing crosstalk attenuation of the conventional semiconductor analog switches, which is approximately 65 dB at 50 kHz and for a load resistance of 600 ohms, by at least a factor of ten.

This is achieved in the invention by selecting a type of analog switching arrangement having two constantly nonconducting additional switching paths which are implemented on the same semiconductor chip and in the same semiconductor technology as the switching paths, i.e., which, like the switching paths, are CMOS switches, for example, and by connecting the two additional switching paths in parallel. Thus, if use is made of a type of analog switching arrangement in which switching paths are nonconducting in the absence of a control signal, their control input may remain unconnected. This parallel combination of the two additional switching paths is connected in series with an inverting unity-gain amplifier, i.e., a unity-gain analog amplifier which introduces a 180-degree phase shift, and this series combination is connected between the oscillator output and the input of the measuring circuit or between the two US transducers.

Under the same measurement conditions are those specified above, i.e., 50 kHz and 600 ohms, a flowmeter realized using the analog switch type DG 307 A of Siliconix had a crosstalk attenuation of about 100 dB, which exceeded all expectations by far.

Figure 2:
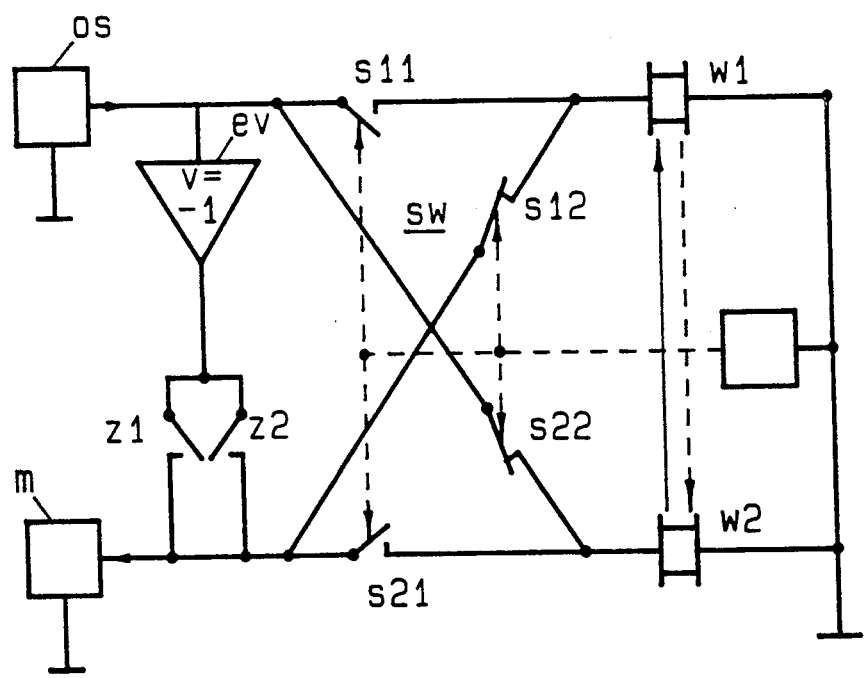

The invention will now be explained in greater detail with reference to the accompanying drawing, in which:

FIG. 1 shows schematically an embodiment of the mechanical portion of an ultrasonic flowmeter, i.e., the fluid-measuring section of the flowmeter, and FIG. 2 is a schematic circuit diagram of the electronic portion of the ultrasonic flowmeter.

In the embodiment of FIG. 1, the two US transducers w1, w2 surround the fluid-measuring section ms, which is a pipe of suitable material in which flows the fluid to be measured. The angle between the line joining the two US transducers w1 and w2 and the direction of fluid flow is therefore 0 degrees.

However, the invention is not limited to this preferred arrangement of the US transducers, the arrangements disclosed in the above prior art, where the US transducers are mounted along the measuring section diagonally opposite each other, are also possible.

In the electronic portion of the invention, shown schematically in FIG. 2, the integrated analog switching arrangement sw comprises the two switching paths s11, s12, which are associated with the US transducer w1, and one of which is conducting when the other is nonconducting. In FIG. 2, a mechanical make contact is shown for the nonconducting switching paths, and a mechanical break contact for the conducting switching paths.

The two functions "conducting" and "nonconducting" must, on the one hand, be implemented simultaneously and, on the other hand, be interchanged by means of a control signal. This can be achieved with a single control signal one level of which is 0 V (=L level), and the other level of which is positive and a few volts (=H level), for example, by using as the nonconducting switching path an N-channel enhancement mode field-effect transistor, which becomes conducting upon application of the H level, and as the conducting switching path an N-channel depletion-mode filed-effect transistor, which is turned off, i.e., becomes nonconducting, upon application of the H level, or by using as the nonconducting switching path a P-channel depletion-mode field-effect transistor, which becomes conducting upon application of the H level, and as the conducting switching path a P-channel enhancement-mode field-effect transistor, which becomes nonconducting upon application of the H level.

If only insulated-gate field-effect transistors of the same conductivity type (N-channel or P-channel) or the same mode of operation (enhancement or depletion) are to be used, the control signal must be applied to the transistor implementing the nonconducting switching path direct and to the transistor implementing the simultaneously conducting switching path through an inverter. What has just been explained applies analogously to the use of CMOS transmission gates for the switching paths.

In FIG. 2, the nonconducting switching path s11 and the conducting switching path s12 are associated with the US transducer w1 by each having one of their terminals connected to one terminal of the US transducer w1, whose other terminal is grounded. Similarly, the other US transducer w2 has the nonconducting switching path s21 and the conducting switching path s22 associated with it, which each have one end connected to one terminal of the US transducer w2, whose other terminal is grounded.

The other ends of the switching paths s11, s22 are connected to the oscillator circuit os, which generates the AC signal producing the ultrasonic wave. The other ends of the switching paths s12, s21 are connected to the input of the measuring circuit m, which derives a signal representative of the velocity of fluid flow in a conventional manner from the travel times measured in the downstream direction and in the upstream direction.

To solve the above-described crosstalk problem, in the circuit of FIG. 2, the two constantly nonconducting additional switching paths z1, z2 are connected in parallel, the inverting unity-gain amplifier ev is connected in series with this parallel combination so that the oscillator signal is applied to the latter 180 degrees out of phase, and this series combination is interposed between the output of the oscillator circuit os and the input of the measuring circuit m. The inverting unity-gain amplifier has a gain of $v=-1$. It is implemented with a suitably wired operational amplifier.

The additional switching paths z1, z2 must be implemented in the same semiconductor technology and on the same semiconductor chip as the switching paths S11, S12, S21, S22 so that they have substantially the same electrical characteristics as the latter.

I claim:

1. Ultrasonic flowmeter comprising at least one pair of ultrasonic transducers (=US transducers) mounted along a fluid-measuring section opposite each other
   whose connecting line makes an angle different from 90 degrees with the longitudinal axis of the fluid-measuring section, and
   which are switchable to transmit or receive mode by means of a semiconductor integrated analog switching arrangement comprising
      two switching paths per US transducer
         one of which is conducting and the other of which is simultaneously nonconducting, or vice versa,
         one end of which is connected to the associated US transducer,
         the conducting switching path associated with one of the US transducers has its other end connected to the other end of the nonconducting switching path associated with the other US transducer and to the input of a measuring circuit, and
         the nonconducting switching path associated with said one of the US transducers has its other end connected to the other end of the conducting switching path associated with the other US transducer and to the output of an oscillator circuit, the improvement comprising:
      two constantly nonconducting additional switching paths implemented on the same semiconductor chip and in the same semiconductor technology as said switching paths and connected in parallel,
      which parallel combination, connected in series with an inverting unity-gain amplifier, is inserted between the oscillator output and the input of the measuring circuit or between the inputs of the two US transducers.

2. A flowmeter as claimed in claim 1 wherein the switching paths are CMOS switching paths.

3. A flowmeter as claimed in claim 1 wherein the US transducers are annular transducers laid around the fluid-measuring section.

4. An ultrasonic flowmeter for measuring fluid flow through a pipe, the flowmeter comprising
   first and second ultrasonic transducers mounted along a fluid measuring section of the pipe opposite each other so that a connecting line between the first and second ultrasonic transducers forms an angle different from 90 degrees with a longitudinal axis of the fluid measuring section,
   an oscillator for generating ultrasonic waves,
   a measuring circuit for deriving a signal representing fluid flow, the measuring circuit including an input and an output,
   the first and second ultrasonic transducers being switchable between a transmit mode and a receive mode by means of a switching circuit including a first switching path coupled between the first transducer and the oscillator, a second switching path coupled between the first transducer and the input of the measuring circuit, a third switching path coupled between the second transducer and the oscillator, and a fourth switching path coupled between the second transducer and the the input of the measuring circuit, the first, second, third, and fourth switching paths being selectively conducting or nonconducting, and the switching circuit including means for switching the first and fourth switching paths alternately from conducting to nonconducting, respectively, and for simultaneously switching the second and third switching paths alternately from nonconducting to conducting, respectively, so that the first and fourth switching paths are conducting while the second and third switching paths are nonconducting and the first and fourth switching paths are nonconducting while the second and third switching paths are conducting, and
   two nonconducting switching paths coupled in parallel, the parallel nonconducting switching paths being coupled in series with an inverting amplifier between the oscillator and the input of the measuring circuit.

5. The flowmeter of claim 4, wherein the first, second, third, and fourth switching paths and the two nonconducting switching paths are implemented on a single semiconductor chip.

6. The flowmeter of claim 4, wherein the inverting amplifier has a gain of one.

7. The flowmeter of claim 4, wherein the first and second ultrasonic transducers are annular transducers coupled around the fluid measuring section of the pipe.

8. The flowmeter of claim 4, wherein the first, second, third and fourth switching paths are CMOS switching paths.

9. The flowmeter of claim 8, wherein the first and second ultrasonic transducers are annular transducers coupled around the fluid measuring section of the pipe.

10. An ultrasonic flowmeter comprising first and second transducers mounted along a fluid measuring section of a pipe opposite each other, an oscillator, a measuring circuit for deriving a signal representing fluid flow, the measuring circuit including an input and an output, the first and second transducers being switchable to a transmit mode or to a receive mode by a switching circuit including first and second switching paths for each of the first and second transducers, one of which is conducting while the other of which is simultaneously nonconducting, or vice versa, one end of the first and second switching paths being coupled to the associated first or second transducer, the first switching paths associated with the first and second transducers having their other ends coupled to the input of the measuring circuit, and the second switching paths associated with said first and second transducers having their other ends coupled to the oscillator, and two constantly nonconducting switching paths connected in parallel, the parallel nonconducting switching paths being coupled in series with an inverting amplifier between the oscillator and the input of the measuring circuit.

11. The flowmeter of claim 10, wherein the first and second transducers are annular transducers coupled around the fluid measuring section of the pipe.

12. The flowmeter of claim 10, wherein the switching paths are CMOS switching paths.

13. The flowmeter of claim 12, wherein the first and second transducers are annular transducers coupled around the fluid measuring section of the pipe.

14. The flowmeter of claim 10, wherein a connecting line between the first and second transducers forms an angle different from 90 degrees with the longitudinal axis of the fluid measuring section of the pipe.

15. The flowmeter of claim 10, wherein the inverting amplifier has a gain of one.

* * * * *